United States Patent
Bitner et al.

(10) Patent No.: US 9,940,022 B1
(45) Date of Patent: Apr. 10, 2018

(54) STORAGE SPACE ALLOCATION FOR LOGICAL DISK CREATION

(71) Applicant: Marvell International Ltd., Hamilton (BM)

(72) Inventors: Haim Bitner, Raanana (IL); Sanjyot Tipnis, Pune (IN); Abhijeet P. Gole, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/147,486

(22) Filed: May 5, 2016

Related U.S. Application Data

(63) Continuation of application No. 14/707,862, filed on May 8, 2015, now Pat. No. 9,335,927, which is a continuation of application No. 14/046,763, filed on Oct. 4, 2013, now Pat. No. 9,032,147, which is a continuation of application No. 12/898,420, filed on Oct. 5, 2010, now Pat. No. 8,566,520.

(60) Provisional application No. 61/248,843, filed on Oct. 5, 2009.

(51) Int. Cl.
G06F 3/06 (2006.01)

(52) U.S. Cl.
CPC .......... G06F 3/0604 (2013.01); G06F 3/064 (2013.01); G06F 3/0631 (2013.01); G06F 3/0683 (2013.01)

(58) Field of Classification Search
None
See application file for complete search history.

(56) References Cited

U.S. PATENT DOCUMENTS

| | | | |
|---|---|---|---|
| 5,535,369 A * | 7/1996 | Wells | G06F 3/0601 711/103 |
| 6,275,898 B1 | 8/2001 | DeKoning | |
| 6,718,436 B2 | 4/2004 | Kim | |
| 6,839,802 B2 | 1/2005 | Dimitri | |
| 6,892,249 B1 * | 5/2005 | Codilian | G11B 20/18 710/5 |
| 7,356,732 B2 * | 4/2008 | Rowe | G06F 11/2094 714/5.11 |
| 2002/0144076 A1 * | 10/2002 | Yamamoto | G06F 3/0617 711/202 |
| 2003/0233518 A1 | 12/2003 | Yamagami | |
| 2004/0123180 A1 | 6/2004 | Soejima | |
| 2004/0158656 A1 * | 8/2004 | Fujibayashi | G06F 3/0607 710/38 |
| 2005/0033935 A1 | 2/2005 | Manbert | |
| 2007/0239952 A1 * | 10/2007 | Hwang | G06F 11/2058 711/162 |

(Continued)

Primary Examiner — Duc Doan

(57) ABSTRACT

The present disclosure includes apparatus, systems, computer readable storage media and techniques relating to virtualization of data storage space. In one aspect, a system includes: solid-state drive (SSD) devices, wherein each of the SSD devices includes contiguous portions; and a data storage controller configured to assign a priority value to each of available ones of the contiguous portions of the respective SSD devices, based on weighted criteria, and choose a subset of the available ones of the contiguous portions of the respective SSD devices, in accordance with the assigned priority values, to form a logical disk; wherein the logical disk includes at least one available portion from each of two or more of the SSD devices.

17 Claims, 5 Drawing Sheets

(56) References Cited

U.S. PATENT DOCUMENTS

2008/0209116 A1 8/2008 Caulkins
2010/0161882 A1* 6/2010 Stern .................. G06F 11/1008
　　　　　　　　　　　　　　　　　　　711/103

* cited by examiner

STORAGE SPACE ALLOCATION FOR LOGICAL DISK CREATION

CROSS REFERENCE TO RELATED APPLICATIONS

This application is a continuation application (and claims the benefit of priority under 35 USC 120) of U.S. application Ser. No. 14/707,862, filed May 8, 2015, now U.S. Pat. No. 9,335,927, which is a continuation application (and claims the benefit of priority under 35 USC 120) of U.S. application Ser. No. 14/046,763, filed Oct. 4, 2013, now U.S. Pat. No. 9,032,147, which is a continuation application (and claims the benefit of priority under 35 USC 120) of U.S. application Ser. No. 12/898,420, filed Oct. 5, 2010, now U.S. Pat. No. 8,566,520, which claims the benefit of the priority of U.S. Provisional Application Ser. No. 61/248,843, filed Oct. 5, 2009 and entitled "SUBDISK ALLOCATION FOR LOGICAL DISK CREATION," the entire contents of which are incorporated by reference.

BACKGROUND

The present disclosure describes systems, apparatuses and techniques relating to data storage technology.

Storage disk virtualization can be used to create an abstraction layer for physical disks or between a physical disk and a user. The abstraction layer can allow a user to access multiple logical representations of a single physical disk. The logical representations are called logical disks that share the resources of the physical disks from which they are created. This allows a logical disk to be created from portions of multiple physical disks, and thus the number of logical disks created can be far greater than the total number of physical disks.

SUMMARY

The present disclosure includes apparatuses, systems and techniques relating to virtualization and flexible allocation of storage disks. Empty spaces in physical storage disks can be allocated to create virtual volumes or logical disks. In at least one aspect, a method performed by a data processing device includes the actions of: identifying a subset of physical disks within a node, the identified subset including at least one of the physical disks having at least one subdisk with free storage space, wherein the node includes processing units and the physical disks arranged to form at least one group; assigning a priority value to the identified subset of the physical disks; sorting the identified subset of the physical disks based on the assigned priority value; and selecting subdisks from the sorted subset of the physical disks to form a logical disk.

Implementations can optionally include one or more of the following features. The identifying can include identifying the subset of the physical disks within the node based on a subdisk allocation map that tracks subdisks in the node already allocated to a logical disk and subdisks in the node with free storage space available to be allocated to a logical disk. The assigning can include: assigning a priority value for sorting the identified subset of the physical disks; assigning a priority value for sorting the processing units within a given group; and assigning a priority value for sorting the at least one group within the node.

Sorting the identified subset of the physical disks based on the assigned priority value can include: sorting the identified subset of the physical disks within each processing unit based on the priority value for sorting the identified subset of the physical disks; sorting the processing units within a given group based on the priority value for sorting the processing units; and sorting the at least one group within the node based on the priority value for sorting the at least one group. The priority value for sorting the identified subset of the physical disks can be assigned based on weighted criteria associated with a disk performance parameter and a ratio of a number of free subdisks to a total number of subdisks for the identified subset of the physical disks.

The priority value for sorting the processing units can be assigned based on weighted criteria associated with at least one from the following: capacity of a given processing unit to provide all subdisks to complete a logical disk; whether a given processing unit is local to corresponding physical disks with affinity to the given processing unit; an average of performance values of corresponding physical disks connected to a given processing unit; a ratio of a number of free subdisks to a total number of subdisks with affinity to a given processing unit; and for a given processing unit, a ratio of a number of valid physical disks to a desired number of subdisks for completing a logical disk, wherein a valid physical disk includes at least one free subdisk.

The priority value for sorting the at least one group within the node can be assigned based on weighted criteria associated with at least one from the following: whether a given group includes physical disks with enough free subdisks to complete a logical disk, wherein all of the free subdisks to complete the logical disk have affinity to a single processing unit within the given group; whether a given group includes physical disks with enough free subdisks to complete a logical disk, wherein all of the free subdisks to complete the logical disk are connected to any processing units within the given group; an average of performance values of processing units connected to a given group; a ratio of a number of free subdisks to a total number of subdisks within a given group; a ratio of a number of valid physical disks attached to a single processing unit within a given group to a desired number of subdisks for completing a logical disk, wherein a valid physical disk includes at least one free subdisk; and a ratio of a number of valid physical disks attached to a given group to a desired number of subdisks for completing a logical disk.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, the disclosed embodiments below can be implemented in various systems and apparatuses, including, but not limited to, a special purpose data processing apparatus (e.g., a wireless access point, a remote environment monitor, a router, a switch, a computer system component, a medium access unit), a mobile data processing apparatus (e.g., a wireless client, a cellular telephone, a personal digital assistant (PDA), a mobile computer, a digital camera), a general purpose data processing apparatus (e.g., a minicomputer, a server, a mainframe, a supercomputer), or combinations of these.

Thus, according to another aspect, a system includes: a node of storage devices, wherein the node includes: physical disks, and processing units, wherein the physical disks and the processing units are arranged to form at least one group; and a disk space manager configured to: identify a subset of the physical disks within the node, the identified subset including at least one of the physical disks having at least one subdisk with free storage space; assign a priority value to the identified subset of the physical disks; sort the identified subset of the physical disks based on the assigned priority value; and select subdisks from the sorted subset of the physical disks to form a logical disk. The disk space manager of the system can be configured to perform the operations of the various methods described and claimed. Moreover, according to another aspect, a computer readable storage medium embodying a computer program product can include instructions to cause a data processing apparatus to perform the operations of the various methods described and claimed.

The described apparatuses, systems and techniques can result in one or more of the following advantages. For example, the described virtualization of the physical disks can be used to select the optimal subdisks for creation of a logical disk given a set of available free subdisks by applying logical disk attributes to a set of selection criteria. The virtualization of physical disks as described herein can be flexible and easily adjustable in the following ways: (i) the weight of each priority criterion is administrator adjustable; and (ii) more criteria can be easily added to the code.

Details of one or more implementations are set forth in the accompanying drawings and the description below. Other features, objects and advantages may be apparent from the description and drawings, and from the claims.

DRAWING DESCRIPTIONS

Like reference symbols in the various drawings indicate like elements.

DETAILED DESCRIPTION

The systems, apparatuses and techniques described herein can be implemented as one or more devices, such as one or more integrated circuit (IC) devices (e.g., computing devices, such as a mobile netbook, a PDA, a smart phone, a desktop computer, a server, a laptop, etc.) For example, the systems, apparatuses and techniques described in this specification can be implemented to implement optimal subdisk allocation for creation of a logical disk given a set of available free subdisks and applying logical disk attributes to a set of selection criteria. A logical disk is a virtual volume, such as a redundant array of independent disks (RAID), formed using portions of a number of physical disks.

Figure 1:
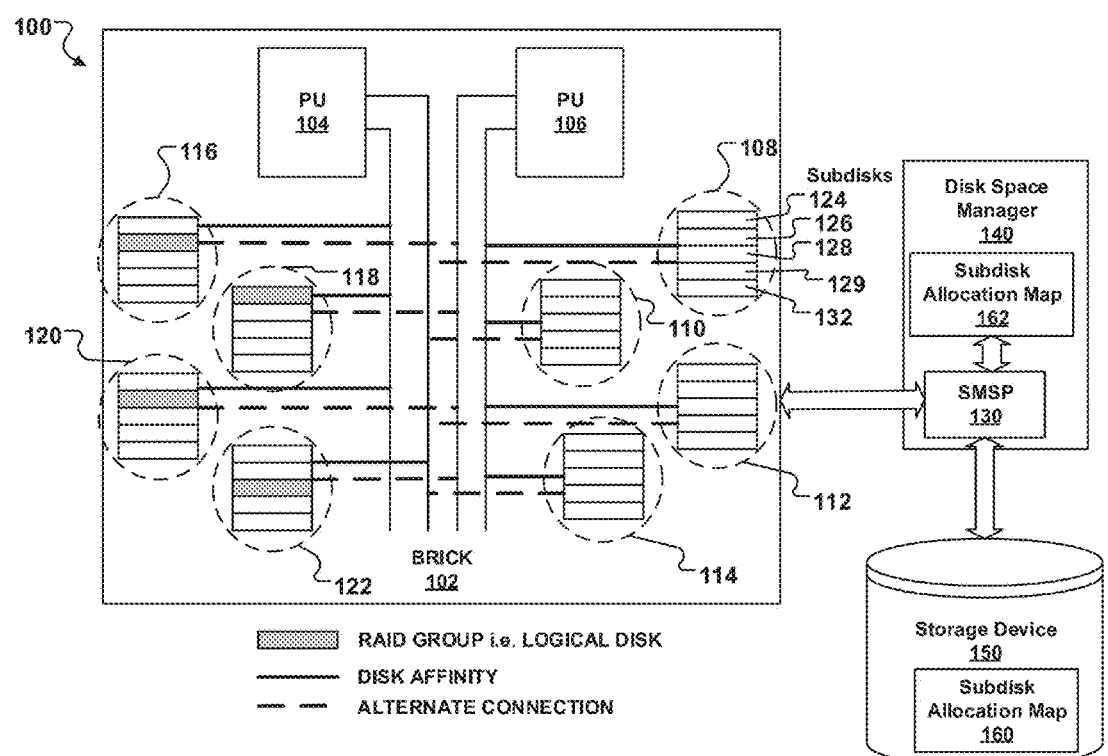
FIG. 1 is a block diagram showing an example of a system for implementing subdisk allocation for logical disk creation.

FIG. 1 is a block diagram showing an example of a system 100 for implementing subdisk allocation for creating a logical disk. The system 100 can include one or more bricks 102 connected together to form a node. Each brick 102 in the system 100 can include two Processing Units (PUs) 104 and 106. Various physical disks 108, 110, 112, 114, 116, 118, 120 and 122 can be attached to both PUs 104 and 106 in the brick configuration. The physical disks can include hard disk drives (HDDs), which are magnetically based non-volatile storage devices. Also, the physical disks can include solid-state drive (SSD) devices, such as flash based memories. Each physical disk can have an affinity to one of the 2 PUs 104 and 106. For a given physical disk, the affinity to one of the PUs 104 and 106 is represented by a solid line. The PU having the disk affinity is designated as a primary PU that serves the associated physical disk. One of the two PUs receives an input/output (I/O) request for accessing the physical disks. The primary PU is the one that actually receives the I/O request. Additionally, the PU that receives the I/O request is considered to be local to the attached physical disks. The other PU of the pair is designated as an alternate PU that can access the associated physical disk when the primary PU fails. The connection between a given physical disk and the alternate PU is represented by a broken line.

Each physical disk in the system is divided into one or more contiguous portions or storage spaces. Each contiguous portion within a given physical disk can be represented as a subdisk. For illustrative purposes, physical disk 108 in FIG. 1 is shown to have five subdisks 124, 126, 128, 129 and 132. A number of subdisks from different physical disks can be grouped to form a logical disk. A RAID group can be formed using a logical disk, for example.

The system 100 also includes a disk space manager 140 that includes a System Manager Storage Pool (SMSP) 130 component, a module that manages disk space resources in subdisk granularity. The SMSP 130 can be implemented as a part of a core processor, software executed by a processor or other hardware components, such as a data storage controller that controls disk space allocation. For software implementations executed by a processor, a software layer can sit above disk device drivers and provide an abstraction layer between the logical disks and physical disks. The SMSP 130 persistently maintains a subdisk allocation map 162 in-core (e.g., locally on the disk manager 140). Additionally, the SMSP 130 can maintain a subdisk allocation map 160 on a persistent storage device 150. The persistent storage device 150 can be separate from the one or more bricks 102, contained within the disks of the one or more bricks 102, or both. When a computing system boots up, the subdisk allocation map can be read from the persistent storage device and/or the stored in-core location. The subdisk allocation map is used by the SMSP 130 to keep track of the allocated and free subdisks in the system 100. From the identified free subdisks in the system 100, the SMSP 130 selects a set of subdisks to form a logical disk. Each subdisk can be selected from a separate physical disk.

In forming a logical disk, the SMSP 130 can be implemented to perform virtualization and flexible allocation of space on the physical disks 108, 110, 112, 114, 116, 118, 120 and 122 during run time. To perform the virtualization and flexible allocation of space, the SMSP 130 can select the optimal subdisks for creation of a logical disk given a set of available free subdisks and apply logical disk attributes to a set of selection criteria. For example, the SMSP 130 can implement an algorithm to allocate space for a virtual volume, such as a RAID. Additionally, the SMSP 130 can perform dynamic allocation of free (e.g., not-full) physical disks by allocating subdisks from different physical disks. In forming the logical disk, the SMSP 130 can select those N subdisks from the set of physical disks 108, 110, 112, 114, 116, 118, 120, 122 present in the system 100. A logical disk should be formed using subdisks within a node rather than across different nodes.

Figure 2:
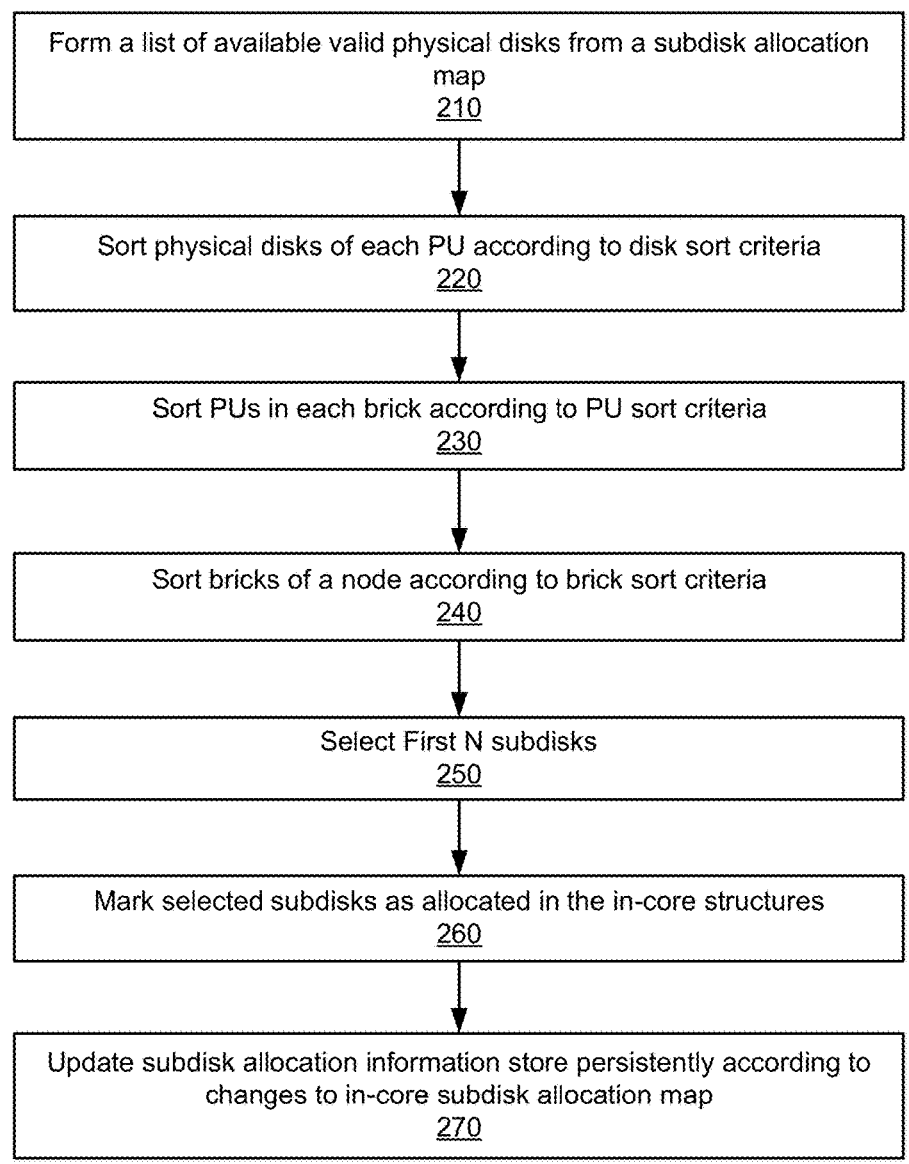
FIG. 2 is a process flow diagram showing an example of a process for creating a logical disk.

FIG. 2 is a process flow diagram showing an example of a process 200 for creating a logical disk. At 210, the SMSP 130 can obtain a list of available valid physical disks from a subdisk allocation map. As described above, the subdisk allocation map can track both already allocated subdisks and free subdisks that are available to be allocated to a logical disk. The subdisk allocation map is updated responsive to changes that occur to the subdisks present in the physical disks 108, 110, 112, 114, 116, 118, 120 and 120. For example, when some of the free subdisks are allocated to create a logical disk, those subdisks are updated as allocated and thus no longer free to be allocated. Also, when the subdisks are removed from the system or taken off-line, those subdisk are updated as being offline and no longer available.

At 220, the SMSP 130 can sort the physical disks of each PU according to disk sort criteria. The disk sort criteria are described further with respect to FIG. 3 below. For example, the physical disks within a processing unit can be assigned a priority value for sorting the physical disks. The priority value can be associated with weighted criteria assigned to each physical disk. The weighted criteria for sorting the physical disks can be based on a disk performance parameter that indicates the performance of the physical disks and/or a ratio of a number of free subdisks to a total number of subdisks for each identified physical disk.

Figure 4:
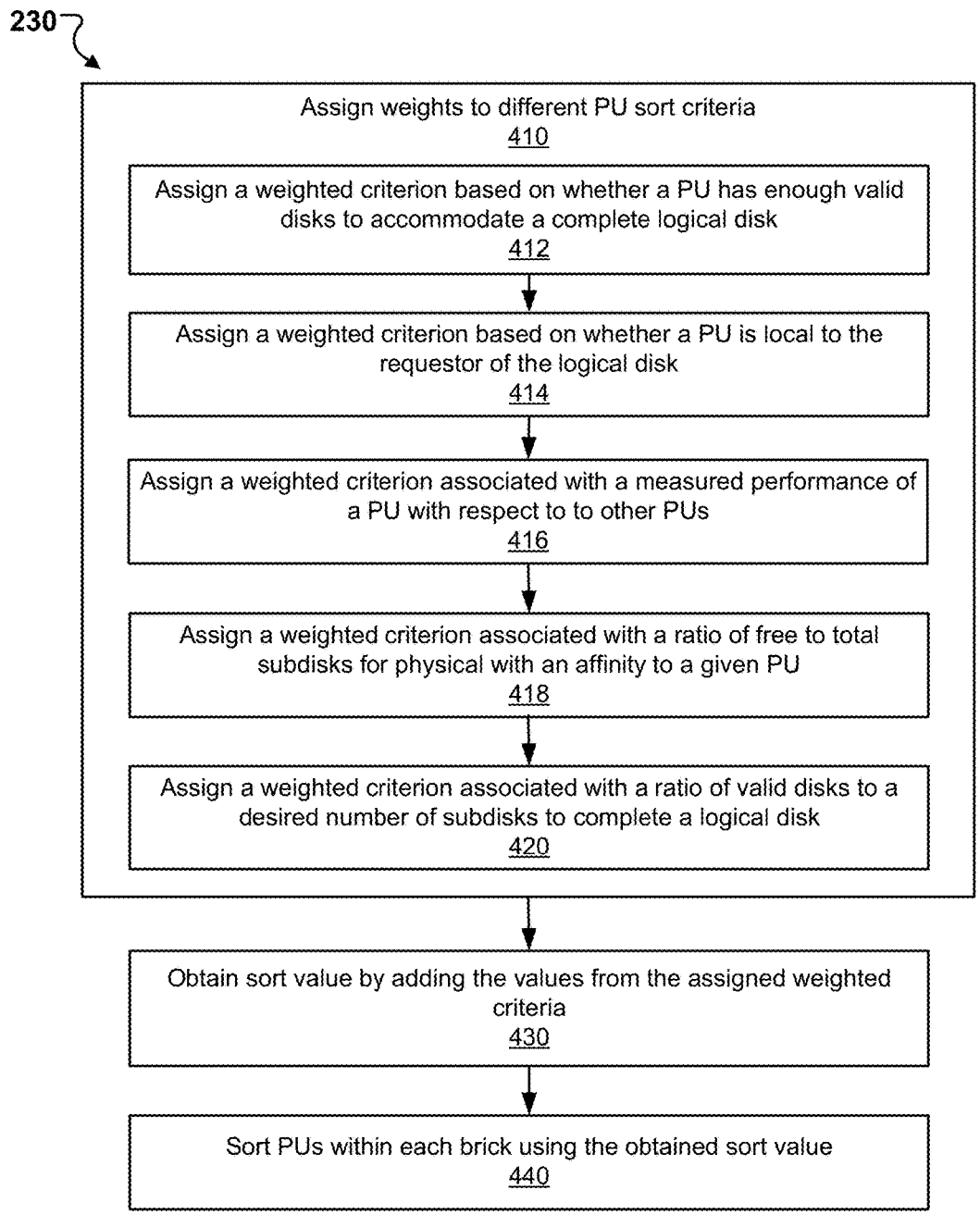
FIG. 4 is a process flow diagram showing an example of a process for sorting processing units.

At 230, the SMSP 130 can sort the PUs in each brick according to PU sort criteria. FIG. 4 describes a process of sorting PUs within a brick based on the PU sort criteria. For example, the processing units within a brick can be assigned a priority value for sorting the processing units. The priority value for sorting the processing units is assigned based on weighted criteria associated with various aspects of the processing units. For example, a weighted criterion can be assigned for the capacity of a given processing unit to provide all subdisks to complete a logical disk. A weighted criterion can be assigned based on whether a given processing unit is local to corresponding physical disks with affinity to the processing unit. A weighted criterion can be assigned for an average of performance values of corresponding physical disks connected to a given processing unit. A weighted criterion can be assigned for a ratio of a number of free subdisks to a total number of subdisks with affinity to a given processing unit. A weighted criterion can be assigned, for a given processing unit, to a ratio of a number of valid physical disks to a desired number of subdisks for completing a logical disk. A valid physical disk includes at least one free subdisk that is online and accessible. Any one, or a combination of two or more of these weighted criteria can be assigned to the processing units to sort the processing units within a brick.

Figure 5:
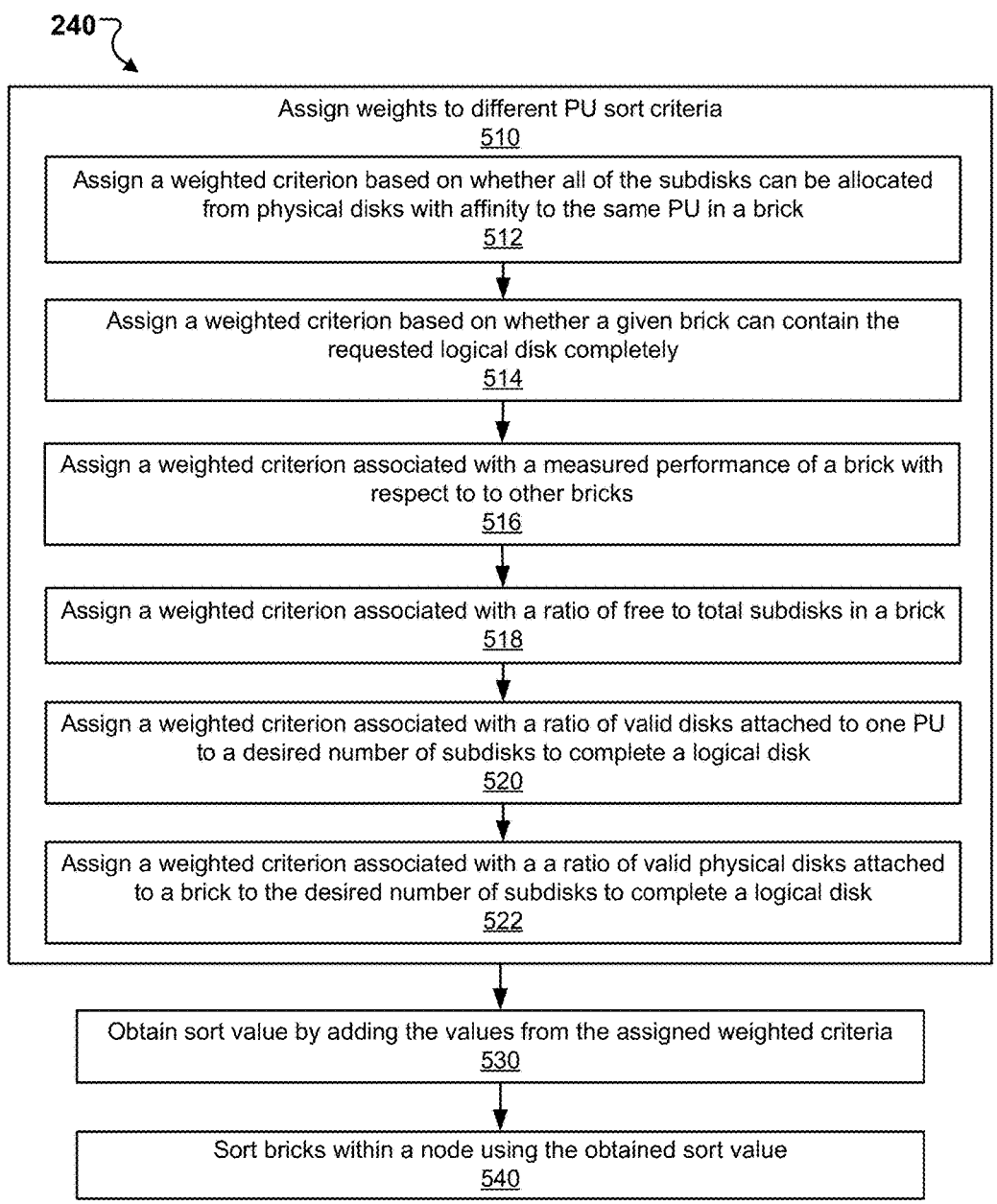
FIG. 5 is a process flow diagram showing an example of a process for sorting bricks.

At 240, the SMSP 130 can sort the bricks of a node according to brick sort criteria described below. FIG. 5 describes a process of sorting bricks within a node based on the brick sort criteria. For example, the bricks within a node can be assigned a priority value for sorting the bricks. The priority value for sorting the bricks is assigned based on weighted criteria associated with various aspects of the brick. For example, a weighted criterion can be assigned for whether a given brick includes physical disks with enough free subdisks to complete a logical disk. All of the free subdisks needed to complete the logical disk have affinity to a single processing unit within the given brick. Another weighted criterion can be assigned for whether a given brick includes physical disks with enough free subdisks to complete a logical disk. All of the free subdisks needed to complete the logical disk can be connected to any processing units within the given brick. Another weighted criterion can be assigned for an average of performance values of processing units connected to a given brick. Additionally a weighted criterion can be assigned to indicate a ratio of a number of free subdisks to a total number of subdisks within a given brick. Another weighted criterion can be assigned to indicate a ratio of a number of valid physical disks attached to a single processing unit within a given brick to a desired number of subdisks for completing a logical disk. A valid physical disk includes at least one free subdisk that is online and accessible. Also, a weighted criterion can be assigned to indicate a ratio of a number of valid physical disks attached to a given brick to a desired number of subdisks for completing a logical disk. Any one or a combination of two or more of these weighted criteria can be assigned to the bricks to sort the bricks within a node.

At 250, the SMSP 130 can select the first N subdisks from the sorted disks, PUs and bricks based on the subdisk selection priorities described above and in connection with FIGS. 3-5 below. At 260, the SMSP 130 can mark the selected subdisks as being allocated in the in-core structures. At 270, the SMSP 130 can update the subdisk allocation information stored persistently according to a changed in-core allocation map as described below. Various examples of aspects of the process 200 are described further below.

To obtain a list of available valid physical disks from a subdisk allocation map, the SMSP 130 keeps track of the physical disks 108, 110, 112, 114, 116, 118 and 120 within each node. The SMSP 130 divides each physical disk into subdisks. The subdisk size can be initially set using a factory setting. Depending on a current subdisk allocation map, the SMSP 130 selects the subdisks for a given logical disk from the set of free subdisks. This selection of subdisks can be based on certain priorities as described below.

Various subdisk selection priorities can be implemented to select from a local node, a single brick, or the same PU. For example, the subdisks can be selected from a local node unless the local node does not have enough disks with free subdisks. In this case, a logical disk can be formed by allocating subdisks from another node. However, subdisks should not be selected from both local and other nodes.

Also, the subdisk selection can be made from a single brick. However, when unable to select from a single brick, then the SMSP 130 can select from as few bricks as possible.

The SMSP 130 can select all subdisks for a given logical disk from the same PU. For example, all subdisks should be selected from physical disks with affinity to a single PU in the brick. When not enough space is available at a single PU, a set of mixed affinity disks can be used. For a Storage Building Block (SBB) architecture, physical disks with affinity to a local PU can be preferred over physical disks from another PU.

Also, the SMSP 130 can select subdisks based on performance requirements. Such performance requirements can be derived from the nature of the storage needed, such as when virtual volumes used for metadata storage need logical disks with higher performance as they would be assessed more often as compared to virtual volumes used for data storage. Thus, the selection criterion can be included in that aspect to provide higher performance subdisks. Note that a disk with a free subdisk in the outer cylinders will typically give better performance than a disk with a free subdisk in the inner cylinders. To measure the performance, the parameter used can be the ratio of the index-of-the-first-free-subdisk to the total-number-of-subdisks in the disk. Thus, for creating logical disks with higher performance, the disks selected can be the ones having free subdisks in outer cylinders. Overall, the SMSP 130 can make subdisk selections that spread allocation evenly amongst different physical disks.

For the subdisk selection algorithm, different selection criteria can be given weights and assigned to the physical disks 108, 110, 112, 14, 116, 118, 120 and 122. For example, when a new logical disk is requested, the SMSP 130 can sort all available physical disks according to fixed selection criteria and administrator adjustable weights. Then the SMSP 130 can select a set of subdisks from the highest scored physical disk(s).

An online admitted physical disk having at least one free subdisk can be considered as a valid physical disk. Note that an online admitted physical disk is an actual physical disk that is attached to the system and has been marked as admitted, i.e., can be used by the SMSP to create subdisks and logical disks. The storage system can have some disks that are not to be used for logical disk or virtual volume creation, and such disks are the ones that are not admitted and hence should not be used by SMSP for subdisk selection. The SMSP 130 sorts all available valid physical disks according to brick priority. Additionally, the SMSP 130 sorts inside a brick according to PU (e.g., affinity) priority, and sorts within a PU by disk priority. Then the first N required disks can be selected.

The subdisks in a physical disk can be numbered from the outer cylinders to the inner ones. Thus, the first subdisk can be allocated from the outermost cylinder, and the remaining subdisks can be sequentially allocated while moving towards the inner cylinders.

The subdisk selection algorithm is flexible and can be easily adjustable in the following ways: (i) the weight of each priority criterion is administrator adjustable; and (ii) more criteria can be easily added to the subdisk selection algorithm code. The weights assigned to the selection criteria for each type of sorting (disk, PU or brick) can all add up to 1. Thus, if a new criterion is to be added, its importance in the sorting with respect to the other existing criteria can be decided. If the new criterion has the highest importance, it can be given a weight of more than 0.5 and the others can be adjusted accordingly. The resultant sorting will take place according to these new weights. Adding a new criterion need only involve including it in the list of existing criteria and assigning the required weight to it. An example of a new criterion can be, if a brick consists of all SDD's then this brick can be given a higher preference for high performance volumes. Thus, a weight can be assigned for disk-type criterion, and subdisks can be selected from this brick if subdisks are being selected for high performance volumes.

Figure 3:
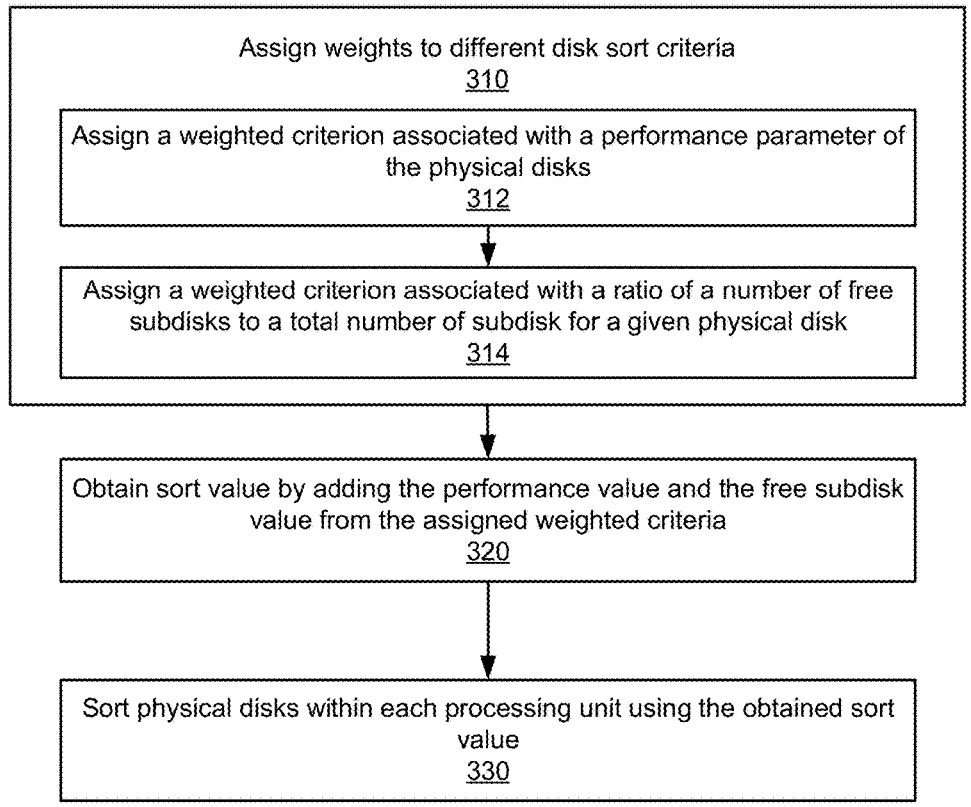
FIG. 3 is a process flow diagram showing an example of a process for sorting physical disks.

FIG. 3 is a process flow diagram showing an example of a process 220 for sorting the physical disks. At 310, in sorting the physical disks 108, 110, 112, 114, 116, 118, 120 and 122, weights can be assigned for different criteria. For example, at 312, weights can be assigned based on a performance parameter of the physical disk. A physical disk with a free subdisk in the outer cylinders can provide better performance than a physical disk with a free subdisk in the inner cylinders. To measure the performance, the parameter used can take into account the ratio of the index-of-the-first-free-subdisk to the total-number-of-subdisks in the physical disk. As another example, a criterion can include disk "wear". SSD tend to wear faster than HDD and many designs are aimed to "wear leveling" the SSD. Using the present systems and techniques, a criterion can be added to prefer a disk with low write count, in order to level the wear and elongate the storage subsystem MTBF (Mean Time Between Failures).

Additionally, at 314, the SMSP 130 can assign weights so that a physical disk with a higher free to total subdisk ratio is given a higher priority. The weight assignment for the performance verses free-space criteria can be derived from the attributes of the Storage Pool, of which the requested logical disk will be a part. At 320, the total sort value is obtained by adding the performance value and the free subdisk value as shown in equation (1) below. At 330, the obtained sort value is used to sort the physical disks within each processing unit.

The following describes an example of assigning weights for a disk sort criterion using equation (1).

$$\text{Sort\_value}=\text{Performance\_val}+\text{Free\_val} \qquad (1)$$

In applying equation (1) above, the total weights assigned should equal to 1. The weight for the performance criterion can be assigned to a set number less than 1, such as 0.6. When N represents the total number of subdisks in the physical disk, as an illustration, the subdisk with an index of P can be identified as the first free subdisk, and the subdisk with an index of Q can be identified as the last free subdisk.

When a logical disk is requested to have subdisks of high performance, the SMSP 130 can select subdisk P and Performance_val can be calculated using equation (2):

$$\text{Performance\_val}=(1-P/N)*\text{Weight\_performance} \qquad (2).$$

As noted above, the subdisk from the outer cylinder provides higher performance than the subdisk from the inner cylinder.

When a logical disk is requested to have subdisks of low performance, the SMSP 130 can select subdisk Q and Performance_val can be calculated using equation (3):

$$\text{Performance\_val}=Q/N*\text{Weight\_performance} \qquad (3).$$

As noted above, the subdisk from the inner cylinder provides lower performance than the subdisk from the outer cylinder.

In this example, the weight for free/total subdisk ratio can be set as 0.4 (because 1−0.6=0.4), and the SMSP 130 can select M subdisks out of the N free subdisks. Then the Free_val can be determined using equation (4).

$$\text{Free\_val}=M/N*\text{Weight\_free} \qquad (4).$$

Once the Performance_val and the Free_val are determined, the Sort_value can be determined using equation (1) above.

FIG. 4 is a process flow diagram showing an example of a process 230 for sorting processing units within a brick. At 410, for sorting the processing units within a brick, weights can be assigned for different PU sorting criteria. Examples of PU sorting criteria can include: contain, local, performance, free space and valid disk count. For example, at 412, the 'contain' criterion describes whether a PU has enough valid disks to accommodate the complete logical disk. A PU that can contain the logical disk completely can be given higher priority over a PU that cannot.

At 414, for the 'local' criterion, the issue is whether a PU is local to the requestor. Physical disks with an affinity to the local PU can be given a higher priority over physical disks with a remote affinity.

At 416, an average of the 'performance' criterion of the physical disks attached to a given PU measures the performance of the PU with respect to the other PU. At 418, for the 'free space' criterion, a ratio of free to total subdisks for physical disks with an affinity to this PU is determined and considered. At 420, for the 'valid disk count' criterion, a ratio of valid-disks-attached to the desired-number-of-subdisks to complete a logical disk is determined and considered. At 430, the PU sort value is obtained by adding up all the values from the assigned weighted criteria described above using equation (5) below. At 440, the PUs are sorted within each brick using the obtained PU sort value.

The following describes an example of applying weights to a PU sort criterion using equation (5).

$$Sort\_value=Contain\_val+Local\_val+Performance\_val+Free\_space\_val+Valid\_val \quad (5)$$

In applying equation (5) above, the total weights assigned should equal to 1. Initially, the SMSP 130 can assign a weight for the contain criterion to a value less than 1, such as 0.55. Thus, the value of Weight_contain can equal 0.55 in this example. When the number of valid physical disks is equal to or greater than the number of desired subdisks, the SMSP 130 can assign Contain_val to be equal to Weight_contain. Otherwise, when the number of valid physical disks is less than the number of desired subdisks, the SMSP 130 can assign Contain_val to equal zero.

Also, the weight for the locality criterion can be assigned a value less than 1, such as 0.15. For example, when the selected PU is a local PU, the SMSP 130 can assign Local_val to equal 0.15. Otherwise, when the selected PU is not a local PU, the SMSP 130 can assign Local_val to equal zero in this example.

Additionally, the weight for performance criterion can be assigned a value less than 1, such as 0.15. Thus, the SMSP 130 can assign Weight_performance to equal 0.15 in this example. The average value of the performance criterion of the physical disks attached to this PU can be designated using a variable A. Then, the SMSP 130 can determine the value of Performance_val using equation (6).

$$Performance\_val=A*Weight\_performance \quad (6)$$

The SMSP 130 can assign a weight for free space to a value less than 1, such as 0.10. Thus, in this example, Weight_free_space can equal 0.10. If for physical disks, with affinity to this PU, the number of free subdisks is P and there are a total of Q subdisks, then SMSP 130 can determine the value of the fee space using equation (7).

$$Free\_space\_val=P/Q*Weight\_free\_space \quad (7)$$

The SMSP 130 can assign a weight for the valid-disk-count criterion to a value less than 1, such as 0.05. Thus, Weight_valid can equal 0.05 in this example. Also, the number of valid physical disks attached to this PU can be represented by a variable N and the desired number of subdisks can be represented by a variable M. Then, the value of the valid physical disk can be determined using equation (8).

$$Valid\_val=N/M*Weight\_valid \quad (8)$$

FIG. 5 is a process flow diagram showing an example of a process 240 for sorting bricks within a node. At 510, for sorting the bricks within a node, weights can be assigned for different brick sorting criteria. Examples of brick sorting criteria can include: contain with a PU, contain in a brick, performance, free space, valid disk count for a single PU and valid disk count within a brick. At 512, the weight applied to the 'contain within a PU' criterion indicates whether all of the subdisks can be allocated from physical disks with affinity to the same PU in a brick. In a given brick, if all subdisks can be allocated from physical disks with affinity to a single PU, then that brick is given higher priority over a brick that needs to spread the logical disk across its PU's.

At 514, the weight applied to the 'contain in the brick' indicates whether a given brick can contain the requested logical disk completely. This can include determining whether the brick has enough valid physical disks attached to any PU in the brick to form the complete logical disk. A brick that can contain the logical disk completely is given higher priority over a brick that cannot.

At 516, the weight applied to the 'performance' criterion indicates the performance of the brick. Specifically, an average of the performance criterion of the PUs attached to the brick measures the performance of a given brick with respect to the other bricks.

At 518, the weight applied to the 'free space' criterion represents a ratio of free to total subdisks in the brick. At 520, the weight applied to the 'valid disk count' criterion for a single PU represents a ratio of valid physical disks attached to one PU to the desired number of subdisks to complete a logical disk. Additionally, at 522, the weight applied to the 'valid disk count within brick' criterion represents a ratio of valid physical disks attached to the brick to the desired number of subdisks. At 530, the sort value for sorting the bricks within a node can be obtained by adding all values associated with the assigned criteria using equation (10) below. At 540, the SMSP can sort the bricks within a node using the obtained brick sort value.

The following describes an example of applying weights to a brick sort criterion using equation (10).

$$Sort\_value=Contain\_single\_PU\_val+Contain\_in\_brick\_val+Performance\_val+Free\_space\_val+Valid\_disk\_single\_PU\_val+Valid\_disk\_within\_brick\_val \quad (10)$$

In applying equation (10) above, the total weights assigned should equal to 1. The SMSP 130 can initially assign a weight for the contain within-a-PU criterion to a value less than 1, such as 0.55. Thus, Weight_contain_single_PU can equal 0.55 in this example. When the number of valid physical disks attached to a single PU of a brick is equal to or greater than the desired number of subdisks, the SMSP 130 can assign Contain_single_PU_val to be equal to Weight_contain_single_PU. Otherwise, when the number of valid physical disks attached to a single PU of a brick is less than the desired number of subdisks, the SMSP 130 can assign Contain_single_PU_val to be zero.

The SMSP 130 can assign a weight for the contain-within-a-brick to a value less than 1, such as 0.15. Thus, in this example, eight_contain_in_brick can equal 0.15. When the number of valid physical disks attached to the brick is equal to or greater than the required subdisks, the SMSP 130 can assign Contain_in_brick_val to be equal to Weight_contain_in_brick. Otherwise, when the number of valid physical disks attached to the brick is less than the required subdisks, the SMSP 130 can assign Contain_in_brick_val equal zero.

The SMSP 130 can assign a weight for the performance criterion to a value less than 1, such as 0.10. Thus, Weight_performance can equal 0.10 in this example. The SMSP 130 can determine the performance value using equation (11).

$$Performance\_val=A*Weight\_performance \quad (11)$$

where the variable, A, represents the average of the performance criterion of the disks attached to this brick.

Also, the SMSP 130 can assign a weight for the free space criterion to a value less than 1, such as 0.10. Thus, Weight_free_space can equal 0.10, in this example. If for disks belonging to this brick, the number of free subdisks is represented using a variable, P, and there are a total of Q subdisks, then the free space value can be determined using equation (12).

$$\text{Free\_space\_val} = P/Q * \text{Weight\_free\_space} \quad (12).$$

The SMSP 130 can assign a weight for the valid-disk-count-for-a-single-PU criterion to a value less than 1, such as 0.05. Thus, Weight_valid_disk_single_PU can equal 0.05 in this example. The desired number of subdisks can be represented using a variable, M, and the number of valid physical disks attached to one PU can be represented using a variable N. The value N can be obtained from the PU with the greater number of valid physical disks. Then the SMSP 130 can determine the value of the valid disk for a single PU using equation (13).

$$\text{Valid\_disk\_single\_PU\_val} = N/M * \text{Weight\_valid\_disk\_single\_PU} \quad (13)$$

The SMSP 130 can assign a weight for the valid-disk-count-within-brick criterion to a value less than 1, such as 0.05. Thus, Weight_valid_disk_within_brick can equal 0.05 in this example. With the number of valid disks attached to this brick represented using a variable, N, and the desired number of subdisks represented using a variable M, the SMSP 130 can determine the value of the valid disk within a brick using equation (14).

$$\text{Valid\_disk\_within\_brick\_val} = N/M * \text{Weight\_valid\_disk\_within\_brick} \quad (14)$$

The following describes an example of a process for persistent storage of a subdisk allocation map. As described above, each physical disk is divided into logical contiguous regions forming a number of subdisks. The size of each subdisk can be the same. Each subdisk in a physical disk can be recognized by using a starting offset of the usable area of the physical disk and the size of each subdisk.

With the size of each subdisk represented by a variable, M, and the starting offset of the usable area of the physical disk represented by a variable, S, the SMSP 130 can recognize that an $N^{th}$ subdisk starts from the offset shown in equation (15).

$$S + (N-1) * M \quad (15).$$

The SMSP 130 stores in the subdisk allocation map, information to identify whether a subdisk is used in a logical disk or whether the subdisk is free. Also, the subdisk allocation map is stored persistently so as to prevent the subdisk allocation configuration from being lost after a reboot. Various techniques can be used to prevent such loss. For example, the data can be stored on a flash memory device. The flash memory device can be mirrored on all PUs so as to be accessible even when just one PU is available. Also, labels can be used to prevent loss of the subdisk allocation configuration. For example, every physical disk can have some space dedicated for storing the configuration persistently. The data associated with the subdisk allocation configuration to be stored persistently can be mirrored on all the available disks to provide high availability.

When a computing system boots up, the subdisk allocation map can be read from the persistent storage and stored in-core. Also, when a new physical disk is added to the system and made usable by the administrator, the new physical disk can be divided to form the subdisks. The number of subdisks formed for each physical disk can be based on the total size of the physical disk. The information associated with the total size of the new physical disk and its subdisks can be stored persistently as a new record to make the physical disk useful for the creation of any new logical disks.

When a new logical disk is created, the subdisk allocation map gets modified. After the in-core subdisk allocation map is modified, the subdisk allocation map can be updated on the persistent storage device 150. In updating the subdisk allocation map, the subdisk allocation map for all physical disks that contribute to the newly created logical disk is updated.

When a previously used physical disk is removed from the system or is inaccessible, the removed or inaccessible physical disk is marked offline. This information can be updated persistently to indicate that the physical disk is no longer used for logical disk creation. New subdisks are selected to replace the subdisks that were allocated in the removed/inaccessible disk.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a non-transitory computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A system comprising:
solid-state drive (SSD) devices, wherein each of the SSD devices includes contiguous portions;
two or more processing units, wherein a first set of the SSD devices has a first of the two or more processing units assigned as primary processing unit to serve the first set of the SSD devices, and a second set of the SSD devices has a second of the two or more processing units assigned as primary processing unit to serve the second set of the SSD devices; and
a data storage controller configured to assign a priority value to each of available ones of the contiguous portions of the respective SSD devices, based on weighted criteria, and choose a subset of the available ones of the contiguous portions of the respective SSD devices, in accordance with the assigned priority values, to form a logical disk;
wherein the logical disk includes at least one available portion from each of two or more of the SSD devices, and the weighted criteria comprise i) capacity of a given processing unit to provide all SSD portions needed to complete a logical disk request from two or more SSD devices to which the given processing unit is assigned as the primary processing unit, ii) whether the given processing unit generated the logical disk request, iii) a ratio of a number of free portions to a total number of portions for the set of the SSD devices having the given processing unit assigned as their primary processing unit, and iv) a ratio of a number of valid devices in the set of the SSD devices having the given processing unit assigned as their primary processing unit to a number the portions needed to complete the logical disk request.

2. The system of claim 1, wherein the weighted criteria, which affect the priority values and the formed logical disk, are changeable by an administrator of the system.

3. The system of claim 1, wherein the weighted criteria, which affect the priority values and the formed logical disk, comprise a wear criterion adding a preference for an SSD device with a lower write count.

4. The system of claim 1, wherein the weighted criteria further comprise an average of performance values corresponding to the two or more SSD devices to which the given processing unit is assigned as the primary processing unit.

5. The system of claim 1, wherein the two or more processing units comprise four or more processing units (PUs) divided into bricks, wherein each of the bricks comprises:
sets of storage devices including the SSD devices and at least one hard disk drive (HDD);
PUs; and
connections creating affinity between each of the PUs and a respective storage device set of the sets of storage devices;
wherein the weighted criteria further comprise brick-level criteria.

6. The system of claim 5, wherein the brick-level criteria comprise:
whether a given brick can provide all the portions needed to complete the logical disk request from storage devices having affinity with a single PU in the given brick;
whether the given brick can provide all the portions needed to complete the logical disk request from storage devices within the given brick;
an average of performance values associated with the PUs of the given brick; and
a ratio of a number of free portions to a total number of portions within the given brick.

7. The system of claim 6, wherein the brick-level criteria further comprise:
a ratio of a number of valid storage devices having affinity with a single PU in the given brick to the portions needed to complete the logical disk request; and
a ratio of a number of valid storage devices within the given brick to the portions needed to complete the logical disk request.

8. A method comprising:
assigning a priority value to each of multiple available portions of respective solid-state drive (SSD) devices based on weighted criteria; and
choosing a subset of the available portions of the respective SSD devices in accordance with the assigned priority values to form a logical disk;
wherein the logical disk includes at least one available portion from each of two or more of the SSD devices; and
wherein the weighted criteria comprise capacity of a given processing unit, which serves as primary processing unit for a subset of the SSD devices, to provide all portions needed to complete a logical disk request, whether the given processing unit generated the logical disk request, a ratio of a number of free portions to a total number of portions for the set of the SSD devices having the given processing unit assigned as their primary processing unit, and a ratio of a number of valid devices in the set of the SSD devices having the given processing unit assigned as their primary processing unit to a number the portions needed to complete the logical disk request.

9. The method of claim 8, comprising receiving an input from a system administrator to change the weighted criteria.

10. The method of claim 8, wherein the weighted criteria, which affect the priority values and the formed logical disk, comprise a wear criterion adding a preference for an SSD device with a lower write count.

11. The method of claim 8, wherein the weighted criteria comprise an average of performance values corresponding to the subset of the SSD devices for the given processing unit.

12. The method of claim 8, wherein the choosing comprises:
  sorting the available portions according to the assigned priority values; and
  selecting a first N number of the sorted portions to form the logical disk.

13. A non-transitory computer readable storage medium embodying a program comprising instructions to cause data processing apparatus to perform operations comprising:
  assigning a priority value to each of multiple available portions of respective solid-state drive (SSD) devices based on weighted criteria; and
  choosing a subset of the available portions of the respective SSD devices in accordance with the assigned priority values to form a logical disk;
  wherein the logical disk includes at least one available portion from each of two or more of the SSD devices; and
  wherein the weighted criteria comprise capacity of a given processing unit, which serves as primary processing unit for a subset of the SSD devices, to provide all portions needed to complete a logical disk request, whether the given processing unit generated the logical disk request, a ratio of a number of free portions to a total number of portions for the set of the SSD devices having the given processing unit assigned as their primary processing unit, and a ratio of a number of valid devices in the set of the SSD devices having the given processing unit assigned as their primary processing unit to a number the portions needed to complete the logical disk request.

14. The non-transitory computer readable storage medium of claim 13, the operations comprising receiving an input from a system administrator to change the weighted criteria.

15. The non-transitory computer readable storage medium of claim 13, wherein the weighted criteria, which affect the priority values and the formed logical disk, comprise a wear criterion adding a preference for an SSD device with a lower write count.

16. The non-transitory computer readable storage medium of claim 13, wherein the weighted criteria comprise an average of performance values corresponding to the subset of the SSD devices for the given processing unit.

17. The non-transitory computer readable storage medium of claim 13, wherein the choosing comprises:
  sorting the available portions according to the assigned priority values; and
  selecting a first N number of the sorted portions to form the logical disk.

\* \* \* \* \*